(12) United States Patent
Huang et al.

(10) Patent No.: US 12,104,370 B2
(45) Date of Patent: Oct. 1, 2024

(54) SLAB JOINT LEAKAGE-PROOF STRUCTURE, PREFABRICATED ROOF PANEL, AND PREFABRICATED ROOF PANEL SYSTEM

(71) Applicant: CHINA CONSTRUCTION SCIENCE AND INDUSTRY CORPORATION LTD., Shenzen (CN)

(72) Inventors: Xiaokang Huang, Shenzhen (CN); Weizheng Kong, Shenzhen (CN); Ling Chen, Shenzhen (CN); Guangyuan Pan, Shenzhen (CN); Shuai Li, Shenzhen (CN); Zehao Cheng, Shenzhen (CN); Faqiang Guo, Shenzhen (CN)

(73) Assignee: CHINA CONSTRUCTION SCIENCE AND INDUSTRY CORPORATION LTD. (CN)

( * ) Notice: Subject to any disclaimer, the term of this patent is extended or adjusted under 35 U.S.C. 154(b) by 0 days.

(21) Appl. No.: 17/786,862

(22) PCT Filed: Oct. 9, 2021

(86) PCT No.: PCT/CN2021/122739
§ 371 (c)(1),
(2) Date: Jun. 17, 2022

(87) PCT Pub. No.: WO2022/073494
PCT Pub. Date: Apr. 14, 2022

(65) Prior Publication Data
US 2023/0250630 A1 Aug. 10, 2023

(30) Foreign Application Priority Data
Oct. 9, 2020 (CN) .......................... 202011075234.4

(51) Int. Cl.
*E04B 1/68* (2006.01)
*E04B 7/20* (2006.01)

(52) U.S. Cl.
CPC .............. *E04B 1/6813* (2013.01); *E04B 7/20* (2013.01)

(58) Field of Classification Search
CPC ........ E04B 1/6813; E04B 7/20; E04F 13/076; E04F 13/0898; E04D 3/38; E21D 11/385
See application file for complete search history.

(56) References Cited

U.S. PATENT DOCUMENTS 2,106,140 A * 1/1938 Strong ...................... E04B 7/20
52/461
2,210,941 A * 8/1940 Johannes .................. E04B 7/20
52/459

(Continued)

FOREIGN PATENT DOCUMENTS

| CA | 2274287 A1 | * 12/1999 | ............ E01F 8/0029 |
| CN | 203782987 U | * 8/2014 | |
| CN | 210316026 U | * 4/2020 | |
| EP | 0340659 A1 | * 11/1989 | |

*Primary Examiner* — Christine T Cajilig
(74) *Attorney, Agent, or Firm* — MASCHOFF BRENAN

(57) ABSTRACT

The present application relates to the technical field of architectural engineering. Disclosed are a slab joint leakage-proof structure of a prefabricated roof panel, a prefabricated roof panel and a prefabricated roof panel system. The slab joint leakage-proof structure comprises a first leakage-proof layer. The first leakage-proof layer comprises two flexible structures which abut against each other and are arranged at the joint of a main rib on the long side of the roof panel and a main rib on the long side of an adjacent roof panel. Either of the flexible structures comprises a main body portion sealably attached to the main rib, and at least one protruding portion which is fixedly disposed on the main body portion, protrudes and extends into the joint, and can tightly abut against the other flexible structure. The protruding portions (Continued)

of the two flexible structures can enclose an air cavity layer sealably isolated from the outside. The air pressure of the air cavity layer is higher than that of the outside for preventing liquid on the bottom end of the joint from permeating into the air cavity layer and entering a room. The slab joint leakage-proof structure has good waterproof performance. The flexible structures are sealably connected to the main ribs, and are not easy to fall off, and the problem that the waterproof performance is poor due to the fact that a mortar is easy to fall off in an existing waterproof mode of filling the mortar is solved.

9 Claims, 3 Drawing Sheets

(56) References Cited

U.S. PATENT DOCUMENTS

| | | | | | |
|---|---|---|---|---|---|
| 3,707,060 | A | * | 12/1972 | Jansen, Jr. | E04B 2/825 |
| | | | | | 52/749.1 |
| 4,825,617 | A | * | 5/1989 | Kinoshita | E04B 1/04 |
| | | | | | 52/235 |
| 4,999,960 | A | * | 3/1991 | Herwegh | E04B 2/90 |
| | | | | | 52/235 |
| 5,888,023 | A | * | 3/1999 | Grabe | E21D 11/385 |
| | | | | | 405/152 |
| 2012/0121338 | A1 | * | 5/2012 | Hentschel | E21D 11/388 |
| | | | | | 405/152 |

* cited by examiner

SLAB JOINT LEAKAGE-PROOF STRUCTURE, PREFABRICATED ROOF PANEL, AND PREFABRICATED ROOF PANEL SYSTEM

TECHNICAL FIELD

The present application relates to the technical field of architectural engineering, and particularly to a slab joint leakage-proof structure, a prefabricated roof panel and a prefabricated roof panel system.

BACKGROUND

Prefabricated decoration is a newly emerging form of decoration construction in recent years. Prefabricated decoration, as the name suggests, means that various parts required for decoration are produced in the factory, and then transported to the decoration site for assembly and installation, eliminating the operations such as measurement, cutting and the like on the various parts at the traditional decoration site, making the construction easier and more convenient. It can greatly improve the construction efficiency at the decoration site, and make the construction site more clean and beautiful. Furthermore, there will not be too much decoration material waste. Therefore, it is a more green and environmentally friendly form of decoration construction.

Prefabricated structure housings adopt steel structure composite roof panels, which are built by joining a plurality of roof panels. There must be slab joints between adjacent roof panels, so the waterproof performance of the slab joints has a great influence on the quality of the roof building and the service life of the building. The slab joints of the current building roof panels are generally treated with micro-expansive mortar for joint filling. For such a waterproof treatment method, the mortar can easily fall off due to gravity or long time, especially during the rainy seasons or when there is a large amount of rainwater gathering, which can easily lead to water leakage and thus affects the normal use of the building, so the waterproof performance is poor.

SUMMARY OF THE INVENTION

The technical issue to be solved in the present application is to overcome the technical problem in the prior art that the slab joints between the prefabricated steel structure roof panels are treated by filling the joints with micro-expansive mortar for waterproof treatment where the micro-expansive mortar is easy to fall off. Therefore, the present application is intended to provide a slab joint leakage-proof structure of a prefabricated roof panel, a prefabricated roof panel and a prefabricated roof panel system with simpler structure and better waterproof performance.

For this, one objective of the present application is to provide a slab joint leakage-proof structure of a prefabricated roof panel, which includes:

a first leakage-proof layer including two flexible structures which abut against each other and are arranged at the joint of a main rib of a roof panel and a main rib of an adjacent roof panel;

either of the flexible structures includes a main body portion sealably attached to the main rib, and at least one protruding portion which is fixedly disposed on the main body portion, protrudes and extends into the joint, and can tightly abut against the other flexible structure;

the protruding portions of the two flexible structures can enclose an air cavity layer sealably isolated from the outside, the air pressure of the air cavity layer is higher than that of the outside for preventing liquid outside the joint from permeating into the air cavity layer and entering a room.

Optionally, the slab joint leakage-proof structure of a prefabricated roof panel, in which either of the flexible structures has at least two protruding portions arranged in an up-down spaced mode, the main body portion and two protruding portions of either of the flexible structures enclose a cavity zone with its opening oriented towards the other flexible structure;

the protruding portions of the two flexible structures are configured to abut against each other correspondingly so that the two cavity zones enclose the air cavity layer.

Optionally, the slab joint leakage-proof structure of a prefabricated roof panel, in which the flexible structures are made of foamed plastics with low thermal conductivity.

Optionally, the slab joint leakage-proof structure of a prefabricated roof panel, in which the main body portion includes a cushion portion, located at the bottom end of the joint and padded at the bottom end of the main rib, and an extending portion, extending upward from the cushion portion into the joint, the extending portion is adapted to be tightly attached to the main rib;

the protruding portions are integrally formed on a side face of the cushion portion and/or the extending portion facing the joint.

Optionally, the slab joint leakage-proof structure of a prefabricated roof panel, in which each of the protruding portions is a protruding bubbled structure with a cavity part inside.

Optionally, the slab joint leakage-proof structure of a prefabricated roof panel, in which the height of the longitudinal cross section of the extending portion is smaller than that of the longitudinal cross section of the joint.

Optionally, the slab joint leakage-proof structure of a prefabricated roof panel, which further includes a second leakage-proof layer filled within the joint and located over the first leakage-proof layer.

Another objective of the present application is to provide a prefabricated roof panel, which includes:

a roof panel main body, composed of a lightweight steel outer-frame and a concrete structure layer within the lightweight steel outer-frame, and a plurality of parallel and/or perpendicularly intersecting reinforcing rebars are provided in the concrete structure layer;

main ribs, arranged on two opposite long sides of the roof panel main body;

end ribs, arranged on two opposite short sides of the roof panel main body;

at least one reinforcing rib, arranged within the concrete structure layer and parallel to the end ribs, both ends of the reinforcing rib are welded to the lightweight steel outer-frame respectively; and the slab joint leakage-proof structure as described in any one of the above.

Optionally, the prefabricated roof panel, in which the upper surfaces of the main ribs are lower than that of the roof panel main body, and the lower surfaces of the main ribs protrude from the lower surface of the roof panel main body; and/or the upper surfaces of the end ribs are lower than that of the roof panel main body, and the lower surfaces of the end ribs are flush with the lower surface of the roof panel main body.

Yet another objective of the present application is to provide a prefabricated roof panel system, which is characterized in including a plurality of prefabricated roof panels as described in any one of the above, and the plurality of the prefabricated roof panels are joined to form the prefabricated roof panel system.

The technical solutions of the present application have the following benefits:

1. The slab joint leakage-proof structure of a prefabricated roof panel of the present application, which includes:
    a first leakage-proof layer including two flexible structures which abut against each other and are arranged at the joint of a main rib of a roof panel and a main rib of an adjacent roof panel;
    either of the flexible structures includes a main body portion sealably attached to the main rib, and at least one protruding portion which is fixedly disposed on the main body portion, protrudes and extends into the joint, and can tightly abut against the other flexible structure; the protruding portions of the two flexible structures can enclose an air cavity layer sealably isolated from the outside, the air pressure of the air cavity layer is higher than that of the outside for preventing liquid outside the joint from permeating into the air cavity layer and entering a room.

In the slab joint leakage-proof structure of a prefabricated roof panel with the above structure, two flexible structures abutting against each other are arranged between joints to constitute the first leakage-proof layer, and the protruding portions on the flexible structures are configured to tightly abut against each other to form an air cavity zone sealably isolated from the outside, so that the outdoor rainwater cannot permeate into the air cavity zone and then into the room, thereby isolating the inside from the outside, thus having good waterproof performance; moreover, the flexible structures are sealably connected to the main ribs, and are not easy to fall off, thereby solving the problem that the mortar is easy to fall off in the existing waterproof mode of filling mortar which causes poor waterproof performance.

2. In the slab joint leakage-proof structure of a prefabricated roof panel of the present application, the flexible structures are made of foamed plastics with low thermal conductivity, which have the function of thermal insulation. On the premise of ensuring the waterproof function, they can also avoid the cold/thermal bridge effects of the steel structure at the location of the joint, thus improving the service life of the roof panel.

3. The slab joint leakage-proof structure of a prefabricated roof panel of the present application further includes a second leakage-proof layer. The first leakage-proof layer and the second leakage-proof layer jointly act at the joint to form a double waterproof structure at the joint, so that the air cavity zone of the flexible structures can still prevent the rainwater from permeating into the room even when the thermal insulation mortar falls off and causes water leakage, thus improving the waterproof performance of the slab joint.

4. In the slab joint leakage-proof structure of a prefabricated roof panel of the present application, the second leakage-proof layer is a thermal insulation mortar layer. By filling the joint with thermal insulation mortar above the flexible structures, the cold/thermal bridge effects of the steel structure at the joint can be prevented from occurring due to the good thermal insulation effect of the thermal insulation mortar.

BRIEF DESCRIPTION OF THE DRAWINGS

In order to illustrate the specific embodiments of the present application or the technical solutions in the prior art more clearly, the accompanying drawings required in the description of the specific embodiments or the prior art will be briefly introduced below. It will be apparent that the accompanying drawings in the description below are some embodiments of the present application, and that other drawings may be obtained by those of ordinary skills in the art based on them without creative efforts.

REFERENCE NUMERALS

1—roof panel; 10—roof panel main body; 11—main rib; 12—end rib; 13—reinforcing rib;
2—flexible structure; 20—main body portion; 201—cushion portion; 202—extending portion; 21—protruding portion; 211—cavity part; 22—air cavity zone; 221—cavity zone;
3—second leakage-proof layer;
4—reinforcing rebar.

DETAILED DESCRIPTION

The technical solutions of the present application will be clearly and completely described below in conjunction with the accompanying drawings. It will be apparent that the embodiments described are only a part of embodiments of the present application, not all the embodiments. All other embodiments obtained by those of ordinary skills in the art based on the embodiments in the present application without any creative efforts shall all be covered within the protection scope of the present application.

Embodiment 1

Referring to FIGS. 1-3 and FIGS. 5-6, a slab joint leakage-proof structure of a prefabricated roof panel as provided in this embodiment includes a first leakage-proof layer and a second leakage-proof layer. The first leakage-proof layer includes two flexible structures 2. The two flexible structures 2 are respectively arranged on the abutting main ribs 11 of two adjacent roof panels 1. That is to say, the two flexible structures 2 are arranged at the joint where the main ribs 11 of two adjacent roof panels 1 abut against each other. The second leakage-proof layer is filled between the joint of two adjacent roof panels 1 and located above the flexible structures 2.

Figure 5:
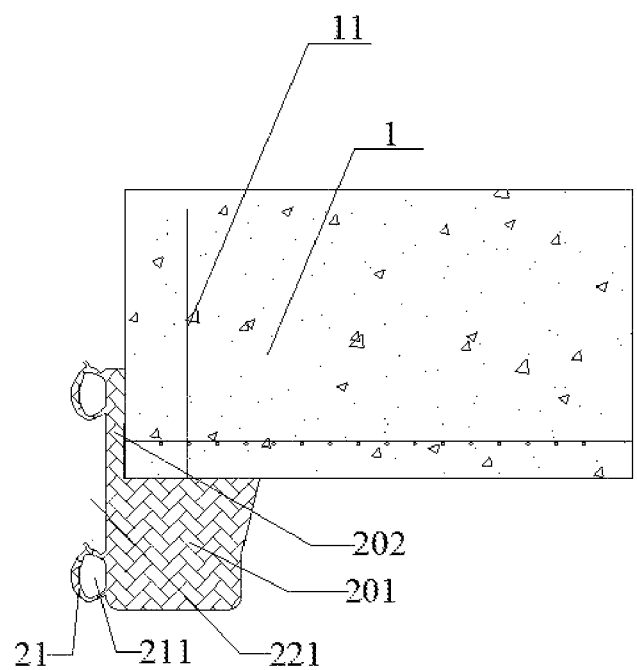
FIG. 5 is a partial view of the longitudinal cross section at location C of FIG. 1.
Figure 6:
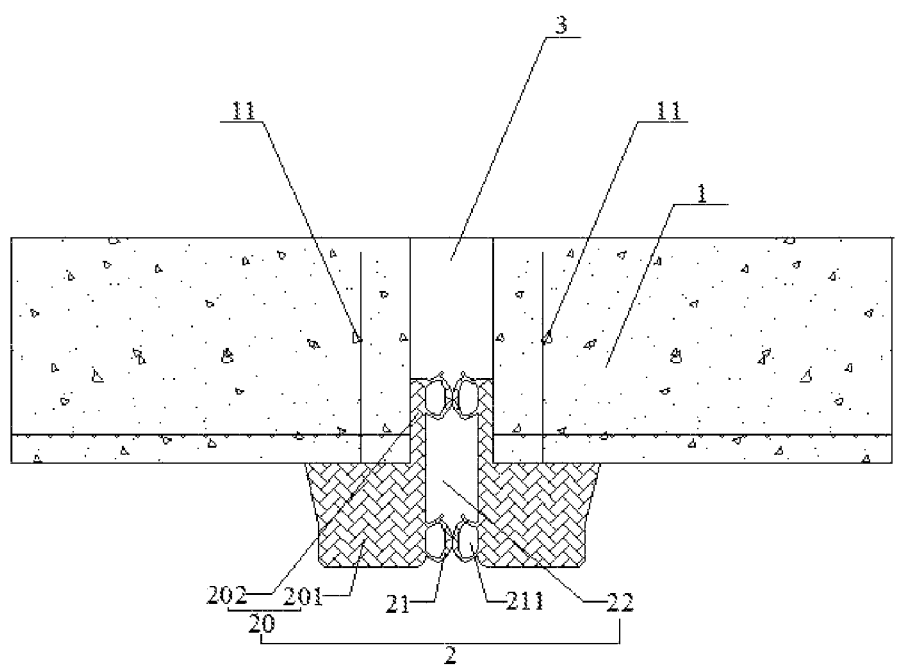
FIG. 6 is a longitudinal sectional view of the slab joint leakage-proof structure in Embodiment 1 of the present application.

Specifically, with regard to either of the flexible structures 2, as shown in FIGS. 5 to 6, it includes a main body portion 20 and a protruding portion 21. The main body portion 20 is in a shape of "L" and includes a cushion portion 201 padded at the bottom end of the main rib 11, and an extending portion 202 extending from the upper end of the cushion portion 201 upward into the joint. The cushion portion 201 is sealably fixed to the bottom end of the main rib with a sealant, and the extending portion 202 is tightly attached to, for example, sealably fixed onto a part of the main rib 11 with a sealant. That is to say, the height of the longitudinal cross section of the extending portion 202 is smaller than that of the longitudinal cross section of the joint, which can not only reduce the size of the flexible structure and reduce the cost, but also reserve part of the gap above the flexible structure 2 at the joint for filling a second leakage-proof layer 3 so as to form a double waterproof construction to improve the waterproof performance. Optionally, the extending portion 202 can also directly extend to the top end of the joint, that is the upper surface of the main rib 11 or the upper surface of the roof panel main body 10. The lateral length of the cushion portion 201 is larger than the lateral length of the extending portion 202, so that the cushion portion 201 can be tightly attached to and padded at the bottom end of the main rib 11, so as to increase the contact area between the flexible structure 2 and the main rib 11, and improve the connection firmness between the flexible structure 2 and the main rib 11. Two protruding portions 21 are integrally formed on a side face of the extending portion 202 and the cushion portion 201 facing the joint. That is, the two protruding portions 21 are arranged in an up-down spaced mode, so that the side face of the main body portion 20 facing the joint and the two protruding portions 21 enclose an unclosed cavity zone 221 with its opening oriented towards the joint. The protruding portions 21 of the two flexible structures 2 are arranged correspondingly, and each of the protruding portions 21 has a spherical structure with a hollow cavity part 211 inside. For ease of description and distinction, the left one of the two flexible structures 2 is described as the first flexible structure, and the right one is described as the second flexible structure; the protruding portion 21 above the two flexible structures 2 is described as the first protruding bubbled structure, and the protruding portion 21 below the two flexible structures 2 is described as the second protruding bubbled structure; the cavity zone 221 of the first flexible structure is described as the first cavity zone, the cavity zone 221 of the second flexible structure is described as the second cavity zone. That is, the first protruding bubbled structure of the first flexible structure tightly abut against the first protruding bubbled structure of the second flexible structure, and the second protruding bubbled structure of the first flexible structure tightly abut against the second protruding bubbled structure of the second flexible structure, thereby making the first cavity zone and the second cavity zone form a closed air cavity zone 22. During installation, the first flexible structure and the second flexible structure need to be squeezed close to each other, so that the first protruding bubbled structure and the second protruding bubbled structure of the first flexible structure and the first protruding bubbled structure and the second protruding bubbled structure of the second flexible structure are respectively squeezed against each other to form a sealed air cavity zone sealably isolated at the bottom end of the joint. Because the gas in the air cavity zone is squeezed, the pressure increases, which is greater than the air pressure at other locations of the joint or that at the bottom end of the joint, so that the rainwater or other liquid entering the joint, particularly outside the air cavity zone, will not permeate into the air cavity zone 22, thereby effectively preventing the rainwater or other liquid from permeating into a room through the joint, thus having an excellent waterproof effect. As an alternative embodiment, there is only one protruding portion 21 arranged for the first flexible structure and only one protruding portion 21 arranged for the second flexible structure, and the two protruding portions 21 are staggered up and down. For example, the first flexible structure is only provided with the first protruding bubbled structure, while the second flexible structure is only provided with the second protruding bubbled structure, and the first protruding bubbled structure of the first flexible structure is located above the second protruding bubbled structure of the second flexible structure. During installation, the first protruding bubbled structure of the first flexible structure tightly abut against the side wall of the extending portion 202 of the second flexible structure, and the second protruding bubbled structure of the second flexible structure tightly abut against the side wall of the cushion portion 201 of the first protruding bubbled structure, so that the first protruding bubbled structure and the second protruding bubbled structure together with the side walls of the first flexible structure and the second flexible structure enclose a closed air cavity zone 22. Preferably, each of the protruding portions is a protruding bubbled structure with a cavity part inside, so that the protruding portion can provide an avoidance space when it is deformed while being squeezed, and it is also convenient for the protruding portion to quickly restore to its original shape when the squeezing on the protruding portion is released. Preferably, the cavity parts can be filled with compressed air. Alternatively, the protruding portions can also be solid and elastic protrusions. The shape of the protruding portions is not particularly limited, and can be spherical, elliptical, heart-shaped, etc.

The material of the flexible structures 2 is preferably foamed plastic with low thermal conductivity, for example, but not limited to, the existing conventional foamed rubber which has the advantages of simple production, low cost, low thermal conductivity, good elasticity, and good thermal insulation performance, further for example, the existing conventional foamed polyethylene, foamed polyurethane, etc. Materials with low thermal conductivity can avoid the cold/thermal bridge effects of the steel structure at the joint, and improve the service life of the roof panel 1. Meanwhile, the flexible structures 2 can wrap the edges and corners of the roof panel 1 to provide protection to the roof panel 1. In addition, since the flexible material has a certain degree of flexibility, when there is a construction deviation in the main structure under the roof panel 1, the flexible material will deform to provide a certain compensation so as to improve the adaptability during installation.

The second leakage-proof layer 3 is, for example, the existing conventional thermal insulation mortar. The thermal insulation mortar is optionally thermal insulation mortar consisting of gelatinous powder and pellets, thermal insulation glazed hollow bead mortar or cement perlite thermal insulation mortar. Optionally, the locations flush with the edge of the upper surface of the second leakage-proof layer 3, particularly the upper surface of the main rib or the upper surface of the roof panel, can be coated with cement-based waterproof coating to provide good thermal insulation property, which, in combination with the flexible structures 2 with low thermal conductivity, can effectively prevent the cold/thermal bridge effects of the metal structure such as the lightweight steel outer-frame at the joint. Alternatively, the second leakage-proof layer 3 may also be made of other waterproof materials, such as water swelling strips, or waterproof sealant, or the like.

Embodiment 2

Figure 1:
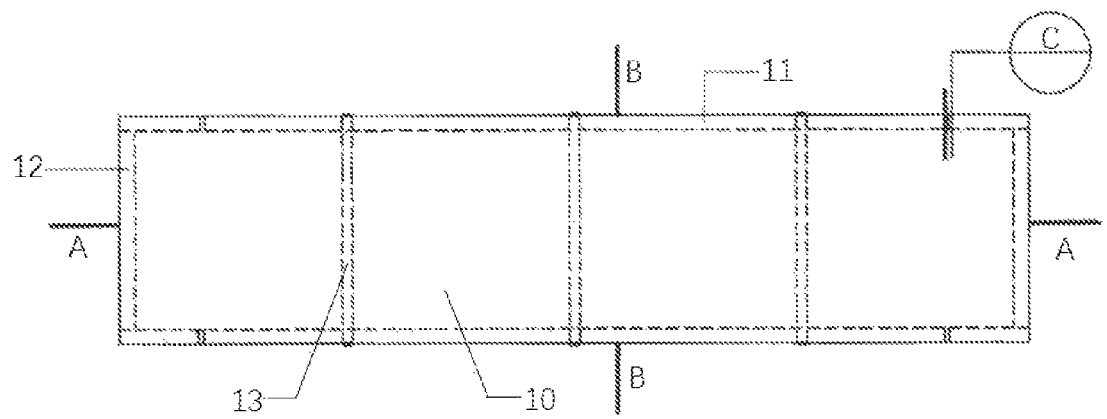
FIG. 1 is a top view schematic diagram of a prefabricated roof panel without reinforcing rebars in Embodiment 2 of the present application.
Figure 2:
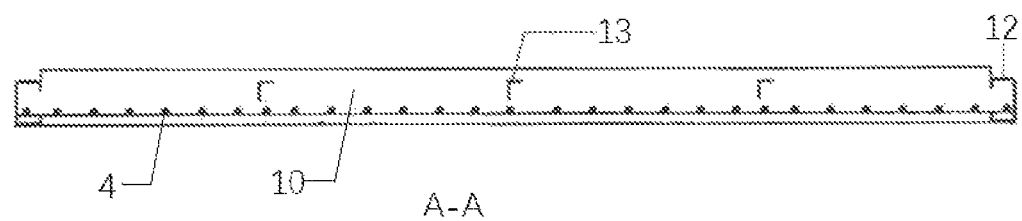
FIG. 2 is a sectional view schematic diagram along the direction of A-A in FIG. 1.
Figure 3:
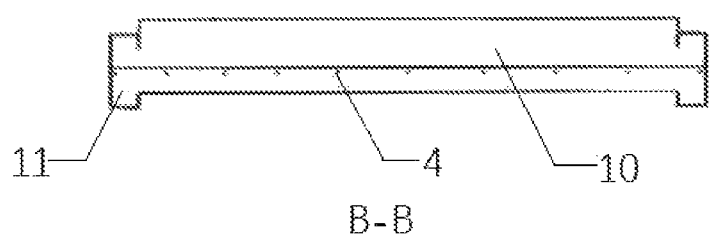
FIG. 3 is a sectional view schematic diagram along the direction of B-B in FIG. 1.
Figure 4:
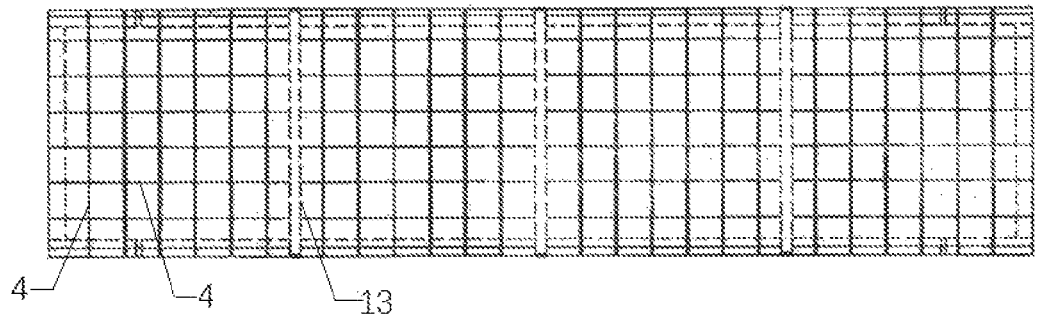
FIG. 4 is a top view schematic diagram of a prefabricated roof panel with reinforcing rebars in Embodiment 2 of the present application.

Referring to FIGS. 1-6, a prefabricated roof panel 1 provided in this embodiment includes a roof panel main body 10, main ribs 11, end ribs 12, reinforcing ribs 13 and the slab joint leakage-proof structure in the above embodiment 1. Wherein, the roof panel main body 10 is a rectangular roof panel being composed of the surrounding lightweight steel outer-frame and a concrete structure layer filled within the lightweight steel outer-frame. The concrete structure layer can be composed of multi-layer composite board cores, reinforcing rebars 4 and externally poured lightweight concrete. They are not specifically described in detail and limited. Composite board cores can be selected by those skilled in the art according to the actual needs. For example, the composite board cores may include core board with a thickness of 30 cm and a density of 500 kg/m$^3$, core board with a thickness of 48 cm and a density of 300 kg/m$^3$, and core board with a thickness of 20 cm and a density of 500 kg/m$^3$, which are laminated up and down. As shown in FIG. 4, there are a plurality of reinforcing rebars 4 which are arranged parallelly and perpendicularly. Preferably, a liquid mud-based composite impermeable coating with a thickness of 1 cm can be provided on the upper surface of the roof panel main body 10, and a water-resistant putty sealing layer with a thickness of 1 cm can be provided on the lower surface of the roof panel main body 10. As shown in FIG. 1, the upper and lower sides of the roof panel main body 10 are long sides, and the left and right sides are short sides. The two long sides are provided with main ribs 11, and the two short sides are provided with end ribs 12. In the middle of the roof panel main body 10, there are further a plurality of reinforcing ribs 13 arranged in parallel with the end ribs 12, and both ends of the reinforcing ribs 13 are welded to the lightweight steel outer-frame respectively. Preferably, the main ribs 11 are lightweight concrete ribs, the end ribs 12 are lightweight concrete ribs, and the reinforcing ribs 13 are angle steel. Optionally, the spacing between the plurality of reinforcing ribs 13 is equal, for example, the spacing between two adjacent reinforcing ribs 13 is ¼ the length of the long side of the roof panel main body 10. The number of the reinforcing ribs 13 may be only one, or may be any other number, which is chosen and designed primarily according to the length of the roof panel main body 10. Optionally, with regard to the main ribs 11, as shown in FIG. 3, the upper surfaces of the main ribs 11 are lower than the upper surface of the roof panel main body 10, and the lower surfaces of the main ribs 11 protrude from the lower surface of the roof panel main body 10. As shown in FIG. 2, the upper surfaces of the end ribs 12 are lower than the upper surface of the roof panel main body 10, and the lower surfaces of the end ribs 12 are flush with the lower surface of the roof panel main body 10. That is to say, the height of the main ribs 11 are higher than that of the end ribs 12.

The slab joint leakage-proof structure in the above embodiment 1 is arranged on the main rib 11 of the roof panel, preferably fixed with adhesive.

Embodiment 3

Referring to FIGS. 1 to 6, a prefabricated roof panel system provided in this embodiment includes a plurality of prefabricated roof panels 1 in Embodiment 2, which is formed by joining the plurality of prefabricated roof panels 1 in Embodiment 2.

The foregoing is only preferred specific embodiments of the present application, but the protection scope of the present application is not limited thereto. Any equivalent replacements or variations made by any person skilled in the art within the technical scope disclosed in the present application, based on the technical solutions of the present application and its inventive concept, shall be covered within the protection scope of the present application.

The invention claimed is:

1. A slab joint leakage-proof structure of a prefabricated roof panel, characterized in comprising:
   a first leakage-proof layer comprising two flexible structures which abut against each other and are arranged at the joint of a first main rib of a roof panel and a second main rib of an adjacent roof panel;
   either of the flexible structures comprises a main body portion sealably attached to the first or second main rib, and at least one protruding portion which is fixedly disposed on said main body portion, protrudes and extends into the joint, and can tightly abut against the other flexible structure; the protruding portions of said two flexible structures can enclose an air cavity layer sealably isolated from the outside, the air pressure of said air cavity layer is higher than that of the outside for preventing liquid outside the joint from permeating into said air cavity layer and entering a room;
   said main body portion comprises a cushion portion, located at the bottom end of the joint and padded at the bottom end of said first or second main rib, and an extending portion, extending upward from said cushion portion into the joint, said extending portion is adapted to be tightly attached to said first or second main rib;
   said protruding portions are integrally formed on a side face of said cushion portion and/or said extending portion facing said joint.

2. The slab joint leakage-proof structure of a prefabricated roof panel according to claim 1, characterized in that, either of the flexible structures has at least two protruding portions arranged in an up-down spaced mode, the main body portion and two protruding portions of either of the flexible structures enclose a cavity zone with its opening oriented towards the other flexible structure;
   the protruding portions of the two flexible structures are configured to abut against each other correspondingly so that the two cavity zones enclose said air cavity layer.

3. The slab joint leakage-proof structure of a prefabricated roof panel according to claim 1, characterized in that, said flexible structures are made of foamed plastics with low thermal conductivity.

4. The slab joint leakage-proof structure of a prefabricated roof panel according to claim 1, characterized in that, each of said protruding portions is a protruding bubbled structure with a cavity part inside.

5. The slab joint leakage-proof structure of a prefabricated roof panel according to claim 1, characterized in that, the height of the longitudinal cross section of said extending portion is smaller than that of the longitudinal cross section of said joint.

6. The slab joint leakage-proof structure of a prefabricated roof panel according to claim 1, characterized in further comprising a second leakage-proof layer filled within said joint and located over said first leakage-proof layer.

7. A prefabricated roof panel, characterized in comprising:
   a roof panel main body, composed of a lightweight steel outer-frame and a concrete structure layer within said lightweight steel outer-frame, and a plurality of parallel and/or perpendicularly intersecting reinforcing rebars are provided in said concrete structure layer;
   main ribs, arranged on two opposite long sides of said roof panel main body;
   end ribs, arranged on two opposite short sides of said roof panel main body;

at least one reinforcing rib, arranged within said concrete structure layer and parallel to said end ribs, both ends of said reinforcing rib are welded to said lightweight steel outer-frame respectively; and the slab joint leakage-proof structure according to claim 1.

8. The prefabricated roof panel according to claim 7, characterized in that the upper surfaces of said main ribs are lower than that of said roof panel main body, and the lower surfaces of said main ribs protrude from the lower surface of said roof panel main body; and/or the upper surfaces of said end ribs are lower than that of said roof panel main body, and the lower surfaces of said end ribs are flush with the lower surface of said roof panel main body.

9. A prefabricated roof panel system, characterized in that, comprising a plurality of prefabricated roof panels according to claim 7, and the plurality of said prefabricated roof panels are joined to form said prefabricated roof panel system.

\* \* \* \* \*